2 Sheets—Sheet 1.

G. E. NEWELL & L. G. LADD.

Assignors to SMITH, GRANT & CO.

HOISTING BUCKET.

No. 10,551. Reissued Jan. 13, 1885.

WITNESSES:

Chas. F. Schmeck

Leonard Scholfield

INVENTOR:

George E. Newell

Loren G. Ladd per L. Scholfield

Attorney

G. E. NEWELL & L. G. LADD. 2 Sheets—Sheet 2.

Assignors to SMITH, GRANT & CO.

HOISTING BUCKET.

No. 10,551. Reissued Jan. 13, 1885.

WITNESSES:

Chas. F. Schmeh

Leonard Scholfield

INVENTOR:

George E. Newell

Lorenzo G. Ladd per S. Scholfield attorney

UNITED STATES PATENT OFFICE.

GEORGE E. NEWELL AND LOREN G. LADD, OF PAWTUCKET, RHODE ISLAND, ASSIGNORS TO SMITH, GRANT & CO., OF SAME PLACE.

HOISTING-BUCKET.

SPECIFICATION forming part of Reissued Letters Patent No. 10,551, dated January 13, 1885.

Original No. 290,649, dated December 18, 1883. Application for reissue filed December 10, 1884.

*To all whom it may concern:*

Be it known that we, GEORGE E. NEWELL and LOREN G. LADD, of Pawtucket, in the county of Providence and State of Rhode Island, have invented an Improvement in Hoisting-Buckets, of which the following is a specification.

The object of our invention is to provide a powerful self-loading hoisting-bucket for unloading coal from the hold of a vessel; and it consists in the improved construction and arrangement of the several parts, whereby the bucket is adapted for efficient operation and for rising upward through the hatch of the vessel without liability of catching.

Figure 5:
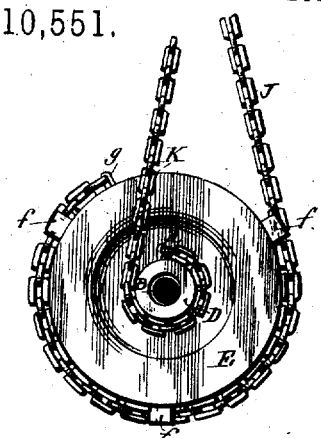
Figure 6:
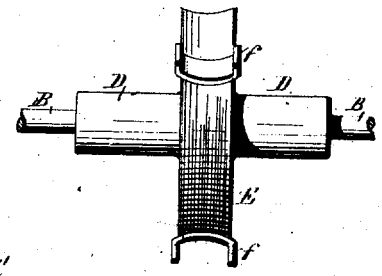
Figure 1:
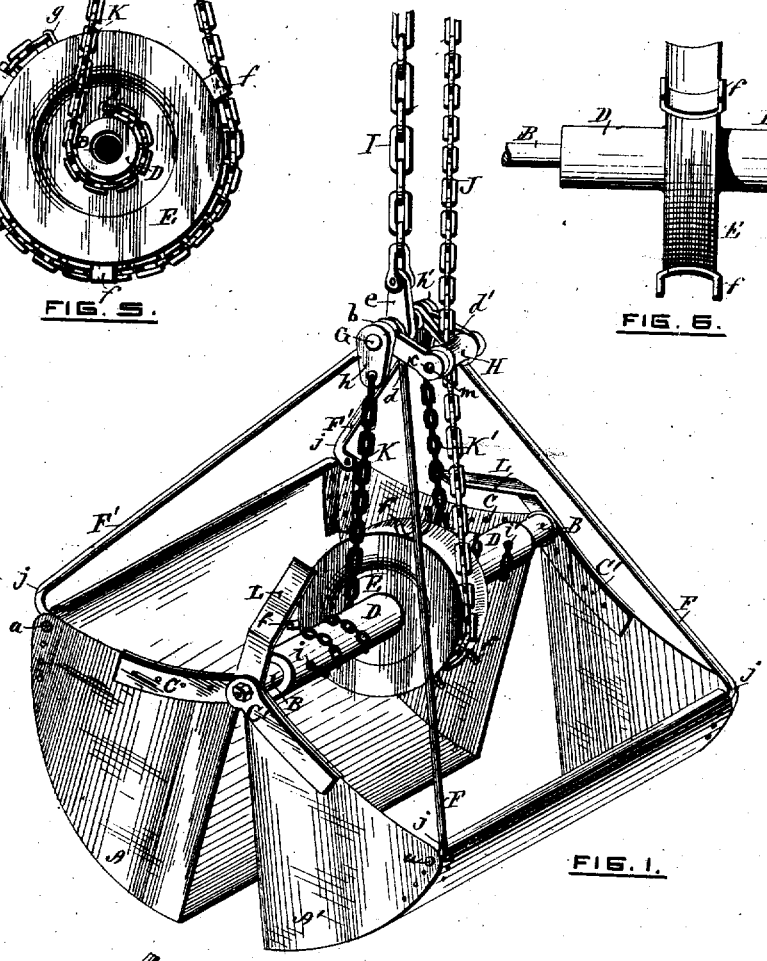

Figure 1 is a perspective view of our improved self-loading bucket. Figs. 2, 3, 4, 5, 6, 7, and 8 are detail views illustrating the parts.

In the accompanying drawings, A A′ are the two jaws of the bucket, which are pivoted to each other by means of a bar, B, the opposite ends of which enter the pivot-holes made in the pivot-pieces C C′, placed at each end of the bucket.

Upon the bar B, between the pivot-pieces C C′, is placed the hollow drum D, in the middle of which is secured the sheave E. The rods F F F′ F′ are pivoted at the corners of the bucket by means of the pivot-pins *a*, and the rods F F′ as they rise from the corners of the bucket converge toward a point over the center of the bucket, where the opposite ends of the rods are likewise pivoted by means of a bolt, G, which extends through the eyes *b*, made at or near the ends of the rods. The rods F′ are extended for a short distance beyond the pivot-eye *b*, thus forming the opposite arms, *d d′*, each provided with a perforation, *c*, adapted to receive an arbor, *m*, upon which, between the arms *d d′*, is placed the loose friction-sheave H.

Between the upper ends of the rods F F, upon the pivot-bolt G, is placed the flat link *e*, to which is secured the chain I.

The opposite edges of the periphery of the sheave E are provided with the outwardly-projecting guides *f*, adapted to guide the hoisting-chain J upon the periphery of the sheave, the chain J being attached to the sheave by means of the staple or eye *g*.

Figures 2, 3:
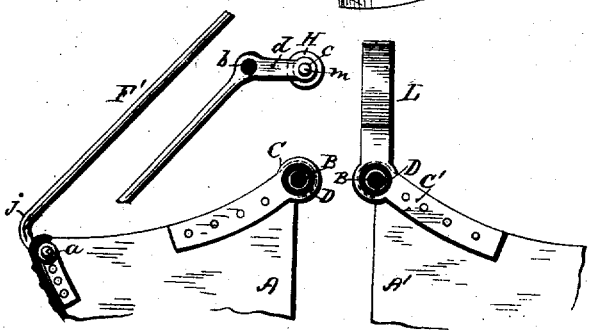
Figure 4:
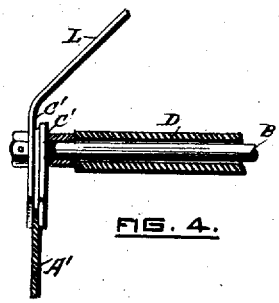

At the opposite ends of the pivot-bolt G are secured the flat links *h h′*, from which depend the chains K K′, adapted to wind upon the drum D at opposite sides of the sheave E, as shown in Fig. 1, and the chains K K′ are secured to the drum D by means of the eyes *i i′*. The rods F F′, by converging to a point above the center of the bucket, serve to guide the corners of the bucket clear of the sides of the hatch, and in order to prevent the corners of the bucket from cutting into the wood-work we provide the rods F F′ with a bend, *j*, near their lower ends, as shown in Figs. 1 and 2, thus preventing all possibility of the corners catching at the hatch in rising from the hold of the vessel; and in order to likewise prevent the pivot-joint of the bucket-jaws from catching at the hatch, we either extend one of the pivot-pieces at each side of the bucket to form an inwardly-directed protecting-bar, L, or attach a separate bar L to the opposite ends of the bucket for this purpose, and by means of the oblique inwardly-directed bars extending from the pivot-joints toward a point above the middle of the bucket, and beyond the plane of the rods F F′, the pivot-joint will be prevented from catching at the hatch in the upward passage of the loaded bucket from the hold.

Figure 7:
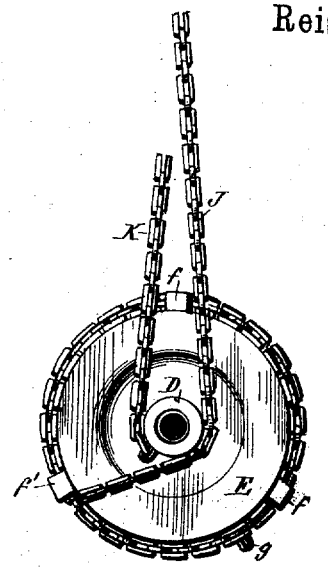
Figure 8:
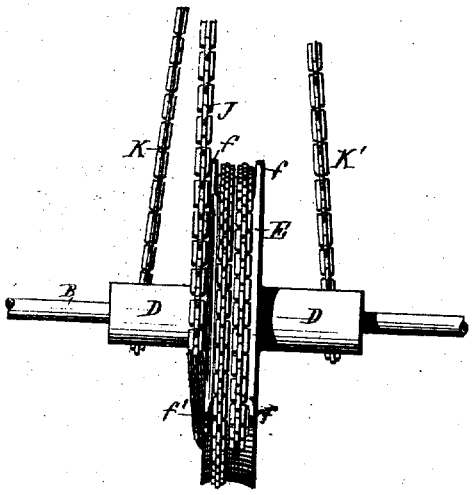

Whenever the chain I is firmly held and the chain J slackened, the jaws of the bucket will be thrown open, and by hoisting on the chain J the resulting rotation of the sheave E and drum D will cause a powerful closing of the jaws of the bucket upon the loose coal in the hold by the winding of the chains K K′ upon the drum, and the bucket may then be hoisted through the hatch by the simultaneous movement of the chains I and J, as usual in operating such buckets. When the bucket is let down upon the coal in an opened condition, the chain J will become slackened and fall away from the periphery of the sheave, so that upon the succeeding attempt to close and raise the bucket the chain J will be often found to leave the groove of the sheave and draw around the under side of the drum D at one side of the sheave, as shown in Figs. 7 and 8, being, however, retained upon the periphery of the sheave at the guide *f′*, beyond which the tendency to leave the sheave at the downward movement of the bucket ceases, and in this case the proper upward pull upon the chain J for closing the jaws of the bucket will cause the revolution of the drum D until the guide *f'* has been brought to the opposite side, after which the chain will draw true from the periphery of the sheave.

We claim as our invention—

1. In a hoisting-bucket, the combination of a hoisting-chain connected to the four corners of the bucket by means of upwardly-converging pivoted rods, and a hoisting-chain operating by means of the sheave and drum, and drum-chains to open and close the bucket, with the opposite inwardly-projecting guide-bars adapted to prevent the pivot-joint of the bucket from catching under the sides of the hatch, substantially as described.

2. In a hoisting-bucket, the combination of the pivoted bucket-jaws with the upwardly-converging rods pivoted within the boundary-line of the corners of the bucket, and provided with an outward bend at near the pivot-joint, whereby the corners of the bucket are prevented from catching at the hatch upon the ascending movement of the bucket, substantially as described.

3. In a hoisting-bucket, the combination of the pivoted bucket-jaws A A', inwardly-projecting guide-bars L L, pivot-bar B, drum D, sheave E, converging pivoted rods F F F' F', the rods F' F' being provided with the arms *d d'*, friction-sheave H, and chains I, J, K, and K', all arranged and operating substantially as described.

4. In a hoisting-bucket, the combination of the opening and closing jaws, the operating-chains, and the drum, with the sheave provided with projecting guides adapted to bring the chain into proper alignment with the sheave in closing the bucket, substantially as described.

GEORGE E. NEWELL.
LOREN G. LADD.

Witnesses:
SOCRATES SCHOLFIELD,
JOSEPH J. SCHOLFIELD.